United States Patent [19]

Close et al.

[11] Patent Number: 5,464,469
[45] Date of Patent: Nov. 7, 1995

[54] VENT SYSTEM FOR BLOCKING THE PASSAGE OF LIQUID WHILE PERMITTING PASSAGE OF GAS

[75] Inventors: Steven F. Close, Telford; Douglas C. Wetterau, Doylestown, both of Pa.

[73] Assignee: Moore Products Co., Spring House, Pa.

[21] Appl. No.: 294,494

[22] Filed: Aug. 23, 1994

[51] Int. Cl.$^6$ .................................................. B01D 19/00
[52] U.S. Cl. .................. 96/220; 55/310; 95/272; 137/587
[58] Field of Search ................................ 55/309, 310, 311, 55/417, 426, 440, 441; 95/262, 272; 96/220; 137/587

[56] References Cited

U.S. PATENT DOCUMENTS

| | | | |
|---|---|---|---|
| 1,610,574 | 12/1926 | Moffat | 55/309 |
| 2,056,755 | 10/1936 | Welch, Jr. | 123/171 |
| 2,329,078 | 9/1943 | O'Daniel | 220/44 |
| 2,366,428 | 1/1945 | Scott | 183/75 |
| 2,521,773 | 9/1950 | Bierman | 220/44 |
| 2,537,094 | 1/1951 | Schmidlin | 55/311 |
| 3,086,549 | 4/1963 | Fino | 55/310 |
| 3,475,885 | 11/1969 | Kline | 55/441 |
| 4,147,096 | 4/1979 | Caswell | 98/122 |
| 4,153,024 | 5/1979 | Sato et al. | 123/198 |
| 4,579,092 | 4/1986 | Kandler | 123/41.86 |
| 4,825,905 | 5/1989 | Whitley | 137/587 |
| 4,877,152 | 10/1989 | Whitley | 220/374 |
| 4,909,408 | 3/1990 | Kos | 220/366 |
| 5,205,848 | 4/1993 | Blanc et al. | 55/310 |
| 5,273,466 | 12/1993 | Thompson | 440/88 |

FOREIGN PATENT DOCUMENTS

| | | | |
|---|---|---|---|
| 1107888 | 8/1984 | U.S.S.R. | 55/310 |
| 2176126 | 12/1986 | United Kingdom | 55/310 |

*Primary Examiner*—C. Scott Bushey
*Attorney, Agent, or Firm*—Synnestvedt & Lechner

[57] ABSTRACT

A vent system which provides constant venting of air through a vent opening in a casing while preventing water from reaching the vent opening and entering the casing, even water from a high-speed jet of water. The vent system is mounted in the vent opening and provides a tortuous path for air between the vent opening and ambient. A central tube contains openings communicating with the interior of a surrounding baffle tube, about half-way along the length of the inner tube, and the baffle tube permits air to pass around its ends between its interior and a surrounding central chamber. End chambers are provided at each end of the central chamber, each communicating with the central chamber. The end chambers have slots in their edges which communicate with ambient, and through which a high-speed jet of water may enter. The water, for the most part, enters one slot, traverses the end chamber, and exits through one or both of the other slots. Venturi-like channels are formed in the end chambers, in which channels the ends of the passages leading to the central chamber are also located, producing a reduced pressure at the exposed ends of the passages, counteracting a tendency of the water flowing across the ends of the passages to fall through the openings into the central chamber. Any water falling into the central chamber drains out through the side slots in the end chambers.

9 Claims, 3 Drawing Sheets

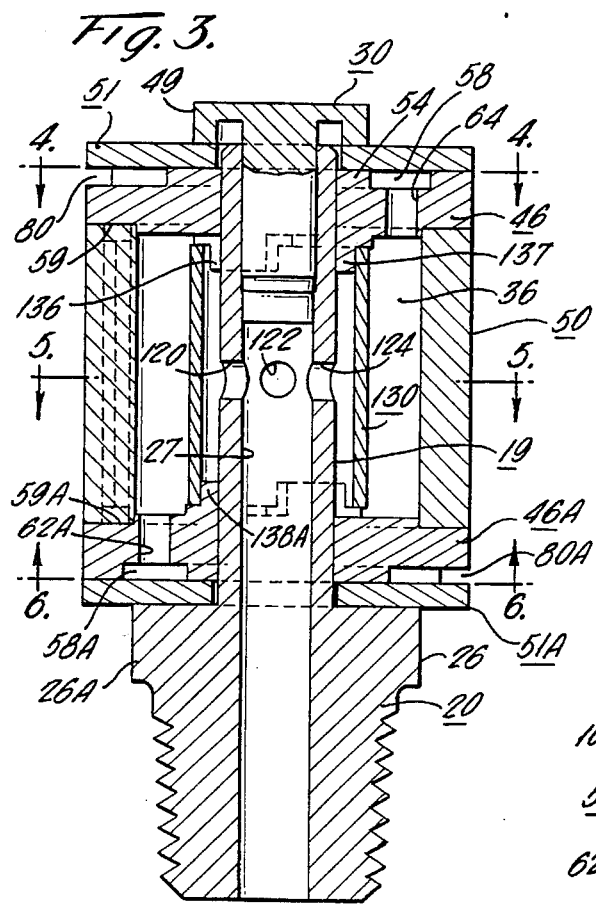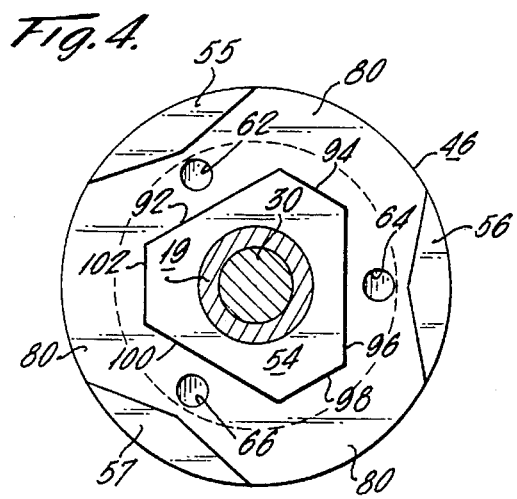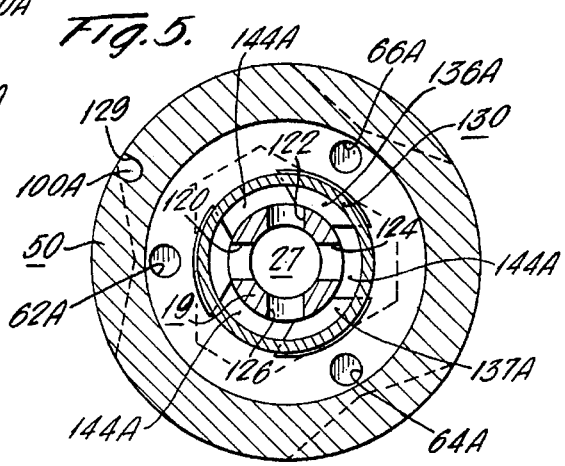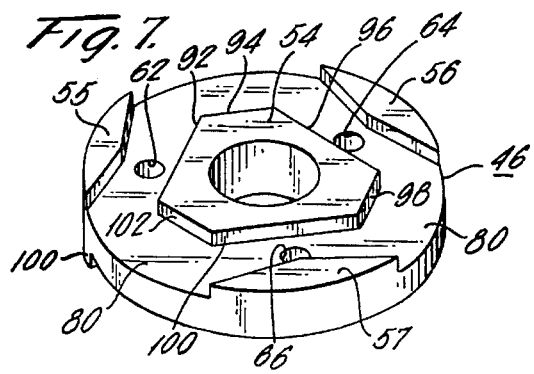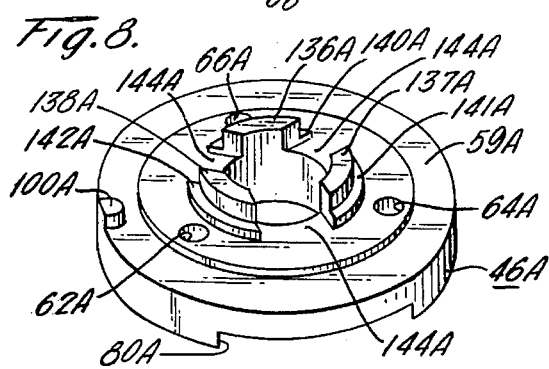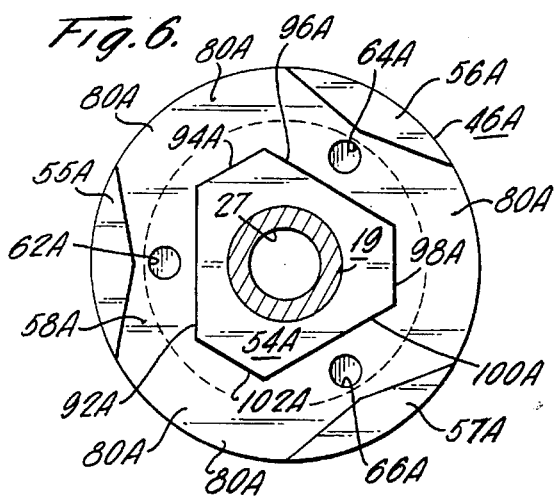

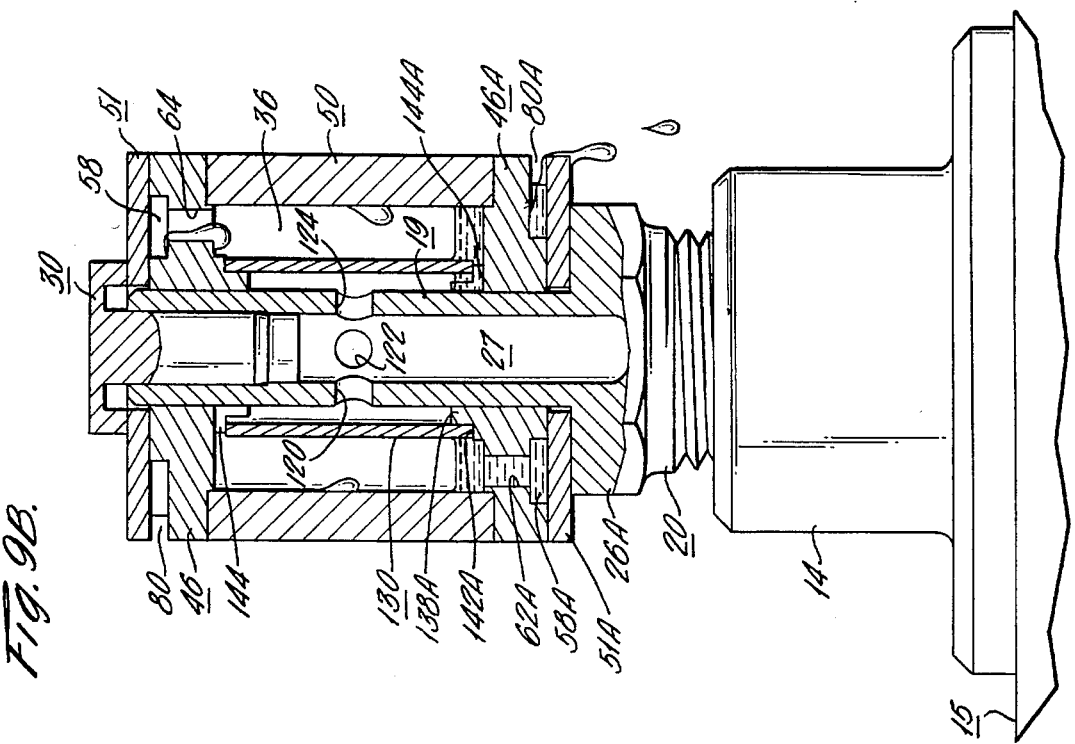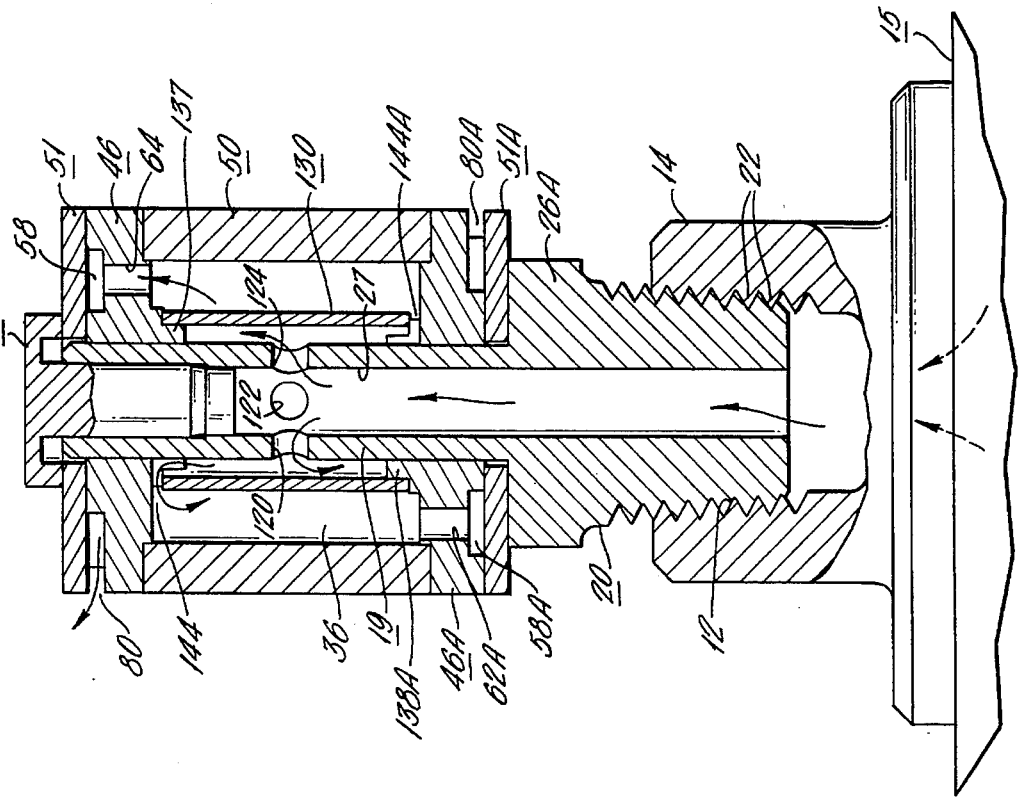

5,464,469

VENT SYSTEM FOR BLOCKING THE PASSAGE OF LIQUID WHILE PERMITTING PASSAGE OF GAS

FIELD OF THE INVENTION

This invention relates to vent systems which are connectable to a vent opening to prevent entry of liquid from the ambient into the vent opening, while permitting the flow of gas through the vent opening. It relates more particularly to such a system which, when placed in a vent opening, can be subjected at its exterior surfaces to a high velocity stream of water without permitting the water to pass through it into the vent opening, and while continuing to provide for the interchange of air between the vent opening and the ambient.

BACKGROUND OF THE INVENTION

There are a variety of applications in which apparatus, such as electronic gear, is provided with a covering to protect it from the surrounding ambient but is provided with a vent opening so that the air can circulate in either direction through the vent opening, for example to avoid variations in air pressure within the covering due to temperature changes. One example is electronic gear positioned at a measurement and/or control point in an industrial process-control system; other analogous situations will occur to one skilled in the art.

In some instances the vent opening is subject to impingement by a moving liquid, for example a rapidly moving stream of water from a cleansing hose, or wind-blown rain, as examples. Such liquid can easily enter the vent opening and undesirably contact the apparatus inside the covering, if protection is not provided.

A large variety of vent systems are known which can be placed in or over such a vent opening in an effort to prevent entry of surrounding liquid, typically water, while permitting the flow through the vent opening of a gas, typically air. However, such known systems have been limited with respect to effectiveness, size, cost, longevity and/or freedom from maintenance requirements, as well as being effective in only one or possibly two positions.

As an example, a standard of the National Electrical Manufacturers Association known as NEMA STANDARD NO. 250-1991 requires testing of a vent system by impinging the vent system with a stream of water flowing at 67 gallons per minute from a 1" diameter nozzle located 10' away from the vent system. To pass this NEMA test, the vent system must provide for easy air flow through the vent opening while preventing the water from the nozzle from entering the vent opening, no matter from which direction it is applied. These requirements have been found difficult to provide.

The preferred embodiment of the present invention meets these NEMA requirements, and is also conveniently small and sturdy, and has a long trouble-free life, as desired.

SUMMARY OF THE INVENTION

In accordance with the invention there is provided a vent system comprising a hollow body defining a first, central chamber and provided with a first port system for interconnecting the central chamber with a vent opening in a casing; it also comprises a second port system at a first end of the first, central chamber for communicating the central chamber with the ambient; preferably there is also a third port system, communicating the first, central chamber with ambient at the opposite end of the first, central chamber.

Also preferably, each of the second and third port systems comprises an end chamber which communicates with ambient through openings in its sides, and which communicates with the first, central chamber through passages extending through an adjacent end wall of the first, central chamber. A path for air flow is thereby established which extends from the vent opening through the first port system, then through the central chamber and the two end chambers, and thence to ambient by way of the side openings in the end chambers.

The walls of the end chambers, and the lateral openings in their sidewalls, are preferably configured so that high-velocity water impingent on an end chamber from the exterior is in large measure directed into and through the end chamber, across the exposed end openings of the passages between the first, central chamber and the end chamber, and then out through an opposite side opening. This not only causes the high-velocity water entering one side opening of either end chamber to flow through and across the end chamber and out one or more of the other side openings of the end chamber, but also creates a venturi effect as the water travels at high velocity across the exposed ends of the passages leading to the central chamber, thereby producing a negative pressure at the adjacent exposed ends of the passages to oppose flow of water through the passages and into the central chamber. The side openings in the end chambers are preferably slot-like in shape and spaced at about 120° around the peripheries of the end chambers, and channels are provided in the end chambers to direct the water flow as described above. Slower moving water, or water which may incidentally pass from an end chamber through the passages leading into the central chamber, may then continue through corresponding passages leading from the central chamber into the opposite, lower end chamber, and thence outward to ambient through the side openings in this opposite end chamber, thus exiting from the vent system without reaching the vent opening in the casing.

Preferably the first chamber includes a baffle device which causes the air to pass along a tortuous path as it passes from the vent opening to the first chamber, and which prevents any water accumulated in the first chamber from passing through or around the baffle, to reach and enter the vent opening.

BRIEF DESCRIPTION OF THE DRAWINGS

These and other objects and features of the invention will be more readily understood from a consideration of the following detailed description, taken with the accompanying drawings, in which:

FIG. 3 is a sectional view taken along lines 3—3 of FIG. 2;

FIG. 4 is a sectional view taken along lines 4—4 of FIG. 3;

FIG. 5 is a sectional view taken along lines 5—5 of FIG. 3;

FIG. 6 is a sectional view taken along lines 6—6 of FIG. 3;

FIG. 7 is an isometric view of the top of the top end plate of the vent system of FIG. 3;

FIG. 8 is an isometric view of the bottom of the top end plate of the vent system of FIG. 1;

FIG. 9A is a vertical sectional view of the vent system of FIG. 1 mounted on a casing and showing a flow path for air through it;

FIG. 9B is a vertical sectional view of the vent system of FIG. 1 mounted on a casing, and showing the draining of water which may enter it.

DETAILED DESCRIPTION OF PREFERRED EMBODIMENTS

Figure 1:
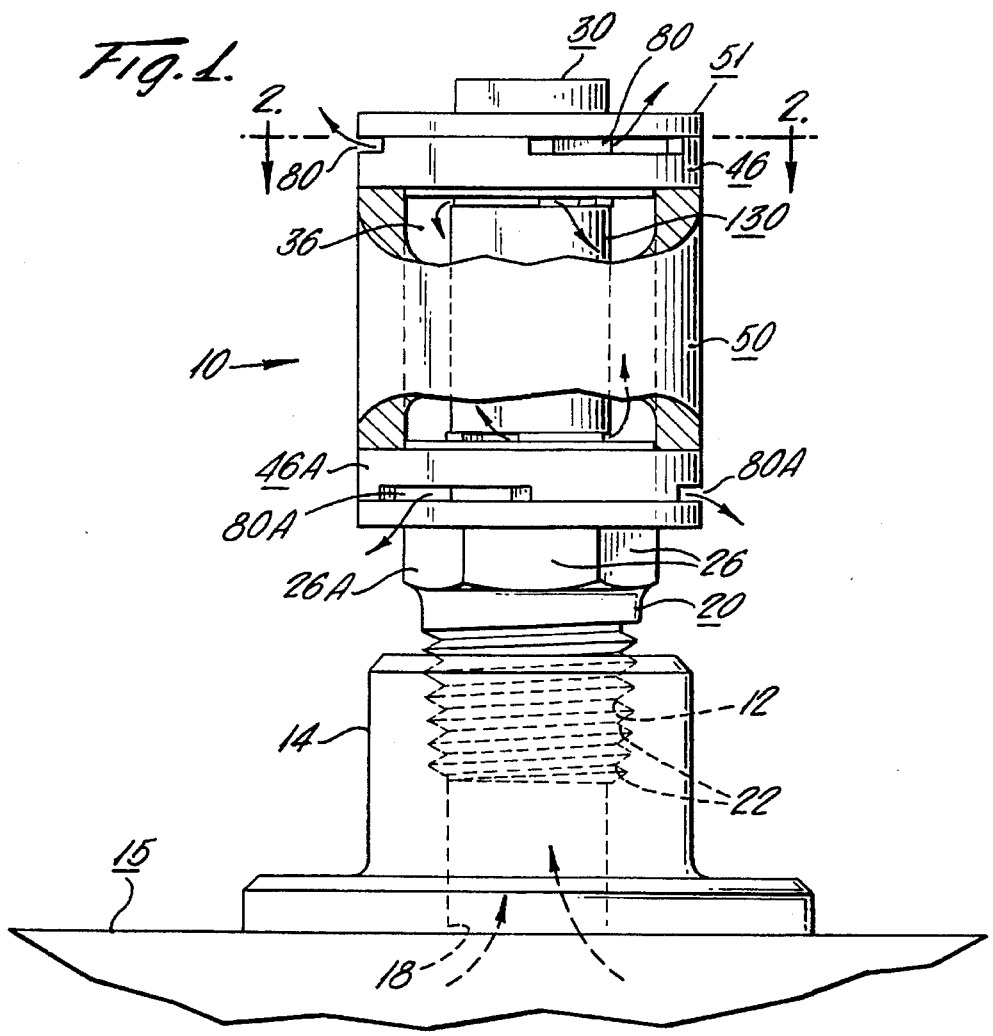
FIG. 1 is a side elevational view of a preferred embodiment of the vent system of the invention, mounted on a casing.

Referring now to the preferred embodiment of the invention shown in the drawings by way of example only, FIG. 1 shows the vent system 10 of the present invention, screwed at one end into a threaded bore 12 in a flanged socket 14, which in turn is secured in any convenient way to the top of a casing 15. Typically, the casing may enclose electronic gear such as a transmitter (not shown) located at an information-monitoring point in a process-control system, for example to measure pressure in a pipe and to transmit the measurements electronically to a remote controller; such electronic gear may require an equilibrium between air pressure inside the casing and the pressure of the surrounding ambient air, and in this event may require some form of vent opening 18.

However, it is also important to protect the electrical gear from water entering the casing 15 by way of the vent opening 18 in the casing. It will be understood that the casing 15 and the vent system 10 may be subjected to a high-velocity flow of water during cleansing with a hose, for example, or may be located in an outdoor environment where wind-driven rain can occur.

It is to provide the desired free flow of air into and out of the casing by way of the vent opening 18 in casing 15, without permitting inflow of externally-impingent water, that the vent system 10 is provided. In this example the system comprises a hollow, central member 19 having an externally-threaded stub portion 20 which supports the remainder of the vent system on the casing, and is screwed into mating internal threads 22 of bore 12 of socket 14. Six flats such as 26 are provided on an enlarged-diameter section 26A of the exterior of stub portion 20 to facilitate its tightening with a wrench. Central member 19 extends upwardly from stub portion 20, its hollow interior forming a central tube 27 (FIG. 3) which extends upwardly to the top of the vent system, where it is closed by a headed pin plug 30, force-fitted into the top end of the tube 27.

The vent system further includes a central chamber 36 defined by circular top and bottom end plates 46 and 46A respectively (FIGS. 3, 4, 6, 7 and 8), which may be metal, plastic or other suitable material and a cylindrical sidewall 50 (FIGS. 3 and 5), which may be of metal or plastic or other suitable material and which serves as a spacer for the two end plates 46, 46A. At the top of the vent system, clamped under the head 49 of pin plug 30 and on top of the end plate 46, is a circular metal washer 51, which may be of metal, and which at its underside bears against an island 54 (FIG. 7) and the tops of three peripheral bosses 55, 56, 57 formed on the top of plate 46, thereby to form a top end chamber 58 between the top end plate and the washer (see FIGS. 1 and 3) with three edge slots such as 80 (FIGS. 1 and 3) spaced circumferentially at 120° to each other about the edge of the top end chamber, providing communication between the end chamber and the surrounding ambient. A structure identical to that at the top of the vent system is provided at the bottom of the vent system to form an identical chamber, with corresponding parts indicated by corresponding numerals followed by the suffix A.

Each end plate 46, 46A is reduced in thickness at its periphery to form open-sided grooves 59, 59A on the sides of the plates facing the interior of central chamber 36 (see FIG. 8); this provides centering for the cylindrical sidewall 50. Thus the ends of the cylindrical sidewall 50 are placed on these peripheral grooves and clamped between the end plates 46, 46A, which are centrally apertured and free to slide on the outside of central tube 27; the lower end plate 46A is clamped against lower metal washer 51A, which in turn bears against the enlarged diameter section 26A of the stub 20 (FIG. 3); an analogous clamping structure is provided at the top of the vent system, except that in this case it is the head 49 of pin plug 30 which urges the top plate 51 downwardly, thus clamping the sidewall cylinder 50 between the two end plates 46 and 46A. In other embodiments, the central tube 27 may extend upward and outward from beyond top washer 51 and be provided with external threads, with a nut engaging the threads so that by tightening the nut the desired clamping action can be obtained.

The top end plate 46 is provided in this example with a set of three through holes or passages 62, 64, and 66 extending through it (FIG. 7), and the bottom plate 46A is provided with a corresponding set of three through passages 62A, 64A, 66A, all extending parallel to the axis of the central chamber 36. The passages in each set are preferably circumferentially spaced from each other by 120°, and permit air to flow in either direction between the central chamber 36 and the two end chambers 58 and 58A.

Figure 2:
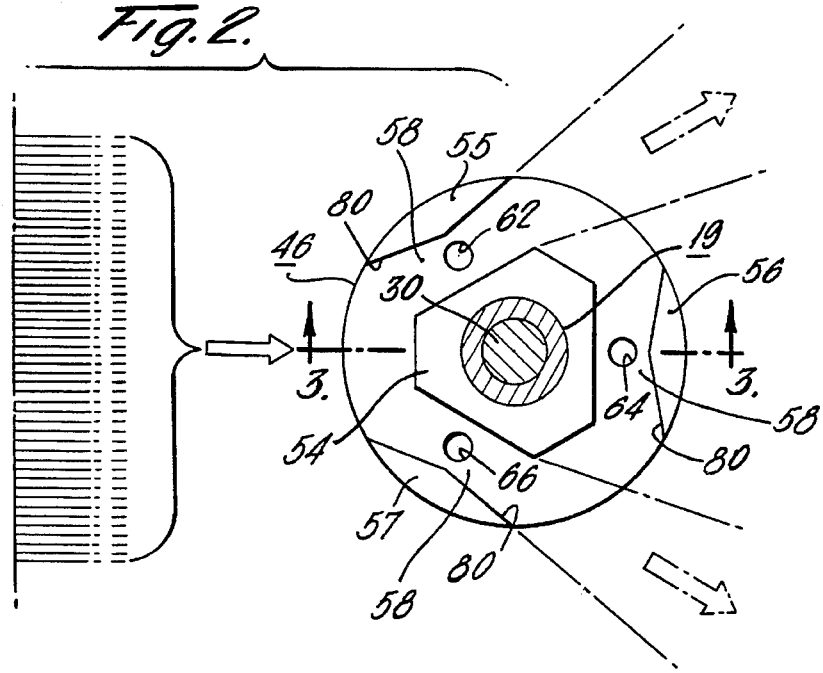
FIG. 2 is a sectional view taken along lines 2—2 of FIG. 1, showing also schematically a jet of water being directed against a side of the vent system.

The island 54 is in this example 6-sided, with alternate sides 92, 96, and 100 centered with respect to the three through holes 62, 64, and 66; the other three sides 94, 98 and 102 are centered on the edge slots such as 80 (see FIG. 7). Each boss 55, 56 and 57 is pie-shaped, with its apex positioned adjacent to the exposed end of one of the three through passages. The result is to form channels for flow of water impingent on a side slot such as 80, so that, as shown in FIG. 2; water traveling inward through any one of the end-chamber side slots divides and flows across the tops of two of the through passages and out the other edge slot, with the channels through which the water flows narrowing to their narrowest point at the apices of the bosses and then diverging again. The rapidly-flowing water exerts a negative pressure on the top ends of the through passages traversed by the stream of water especially the two first traversed by the water stream,, thus greatly reducing the amount of water which will pass downward through the through passages into the central chamber. It is understood that these structures and functions are repeated at the lower end chamber 58A.

The edge slots such as 80, 80A also provide drainage for any water, particularly slowly-moving water, which may fall into and through any of the through passages in either end plate and thereby into the central chamber 36. As shown in FIG. 9B, once in the central chamber, the water passes through the opposite, lower set of passages 62A, 64A and 66A (FIG. 6) in the bottom end plate 46A, then into the opposite end chamber 58A, and thence to ambient by way of the edge opening or slots 80A provided in this end chamber, again as shown in FIG. 9B.

While the figures show the vent system in only one orientation, it is a major advantage of this vent system that it can be disposed in any orientation and still provide protection of the vent opening from the stream of water.

Thus if it is inverted, it works exactly as described above, but with the functions interchanged. If it is tilted about a horizontal axis, it will work similarly, with drainage of the central chamber by way of whatever edge slots are lower in position; even if it is lying on its side, the same functions are provided, drainage occurring through the lower or lowest passages and slots.

In this preferred embodiment, the two end plates 46, 46A are located in specific relative angular positions, about the axis of the central chamber 36, so that the sets of passages in one end plate are at different angular positions than the set of passages in the other end plate. This is accomplished in this embodiment by providing in the cylindrical sidewall 50 a vertical slot 129, parallel to the axis of the central chamber 36, in which slot the small nub 100 on end plate 46, and a corresponding small nub 100A on the lower end plate, are located during assembly. This assures a specific relative angular relational between the first and second sets of passages. With this relation of the passages and slots, if the vent system is on its side the liquid accumulating in the chamber will drain out through at least one of the passages and one of the end slots, preventing water from accumulating sufficiently to enter the central tube and reach the vent opening.

Air communication between the interior of central tube 27 and ambient is provided as follows. Four 90°-spaced holes 120, 122, 124, and 126 (FIG. 5) are provided in the wall of the central tube and communicate with the space between it and a surrounding baffle tube 130. Each end of the baffle tube is seated in a positioning structure comprising three upwardly-protruding centering members 136, 137, 138 preferably integral with the adjacent end plate 46 (see FIG. 8). Each of these centering members is provided with a step, such as 140, 141, 142, positioned on the face of the end plate, so that when the baffle tube is in place on the steps there are thereby created three circumferentially-spaced openings such as 144 (FIG. 9B) between the steps, through which air from holes 120, 122, 124 and 126 in the central tube 27 can flow to the central chamber 36, or in the opposite direction. The baffle tube and the end plate structure for supporting it may be identical at each end of the baffle tube, so that the desired air communication between the interior of the baffle tube and the central chamber is provided at both ends of the baffle tube; and should one end of the chamber 36 become partially filled with water, so as to close off the path for air flow at one end of the baffle tube (as shown in FIG. 9B, at 144A), the air can still flow through the openings 144 provided by the above-mentioned steps at the other end of the baffle tube. All of this remains true regardless of the orientation of the entire vent system.

In operation then, the vent system is assembled and screwed into the threads 22 in the socket 14 on the casing 15. Air communication is thereby provided as shown by the arrows in FIG. 9A, between the vent opening 18 and ambient, in either direction, by way of holes 120, 122, 124 and 126 in the central tube, around the end or ends of the baffle tube 130, through the through passages in the end plates, and out through the edge slots in the two end chambers 58 and 58A. Fast-moving water impingent on the end chambers entering any one of the edge slots flows rapidly through the two channels confronting it in the end plate, and exits through the other edge slots. Any water passing downward through the passages in the end plate and into the central chamber 36 may collect momentarily to a small depth in the central chamber, but will drain out of the central chamber through the corresponding passages in the opposite, lower end plate, and then will exit to ambient through the edge slots in the lower end plate. While some water may accumulate in the central chamber as shown in FIG. 9B, it is not sufficient to rise inside baffle tube 130 to the height of holes 120, 122, 124, or 126 in the central tube 27, and hence will not reach the vent opening 18 and the apparatus enclosed by casing 15. This same general operation occurs substantially regardless of the orientation of the vent system and the direction of impingement of the stream of water.

While the invention has been described with particular reference to specific embodiments in the interest of complete definiteness, it will be understood that it may be embodied in a variety of forms diverse from those specifically shown and described, without departing from the spirit and scope of the invention.

What is claimed is:

1. In a vent system adapted for placement in a vent opening to permit gas to flow through it while preventing substantial flow into said vent opening of liquid from an externally-applied stream, comprising:

a hollow body having first and second end wall structures and sidewalls, together defining a central chamber within said body;

a first port system for said central chamber, secured to said hollow body, and adapted to be connected to said vent opening to permit gas flow between said vent opening and the interior of said central chamber;

a second port system at a first end of said central chamber, permitting gas flow between the interior of said central chamber and the surrounding external ambient;

the improvement wherein:

(a) said second port system comprises a first end chamber adjacent and external to said central chamber, having an end wall substantially parallel to and confronting said first end wall structure of said central chamber and having sidewalls spacing said end wall of said first end chamber from said first end wall structure of said central chamber to define said first end chamber;

(b) said first end wall structure contains at least one passage extending through it, interconnecting said central chamber and said first end chamber;

(c) said sidewalls of said first end chamber contain a first set of openings positioned to permit liquid directed in a stream against the exterior of said first end chamber to enter one of said openings, then to flow rapidly across the end of said at least one passage exposed in said first end chamber, and thereafter to flow out of said first end chamber through another of said first set of openings to ambient; and (d) said first end chamber contains liquid-flow guiding channels for guiding said liquid from any of said openings over the exposed end of said at least one passage and out of at least one of the others of said openings.

2. The system of claim 1, comprising:

(a) a second end chamber adjacent and external to the opposite end of said central chamber, and comprising another end wall substantially parallel to and confronting said second end wall structure of said central chamber and sidewalls spacing said another end wall of said second end chamber from said second wall structure of said central chamber to define said second end chamber;

(b) said second wall structure having at least one passage extending through it, interconnecting said central chamber with said second end chamber;

(c) said sidewalls of said second end chamber containing a second set of openings positioned to permit liquid directed in a stream against the exterior of said second end chamber to enter one of said second set of openings, to flow rapidly across the exposed end of said at least one passage in said second end wall structure, and to flow thence out of said second end chamber to ambient through another of said second set of openings; and (d) said second end chamber contains liquid-flow guiding channels for guiding said liquid from any of said openings over the exposed end of said at least one passage and out of at least one of the others of said openings.

3. The system of claim 1 or claim 2, wherein each of said first set of openings is in the form of a circumferentially-extending slot in said sidewall of said first end chamber.

4. The system of claim 1 or claim 2, in which each of said sets of openings comprises three circumferentially-extending side slots situated at about 120° intervals around the center of the associated end wall structure, and said passages through said first end wall structure are three in number spaced about the center of the first end wall structure at about 120° intervals, midway between the angular positions of said side slots.

5. The system of claim 1, wherein said channels are of non-uniform width, and narrowest adjacent to said exposed end of said at least one passage.

6. The system of claim 1, wherein said central chamber contains a tortuous path permitting gas to flow between said first port system and said second port system, while opposing flow of liquid between said first and second port systems.

7. The system of claim 2, wherein said central chamber contains a baffle tube coaxial with said central chamber and wherein said baffle tube is mounted to permit flow of liquid around each of its ends.

8. The system of claim 2, wherein said at least one passage comprises a first set of circumferentially spaced apart passages in said first end wall structure and a second set of circumferentially spaced apart passages in said second end wall structure.

9. The system of claim 8, wherein said first set of openings are differently positioned than said second set of openings, about the axis of said central chamber.

\* \* \* \* \*